US010245684B2

(12) United States Patent
Avellaneda et al.

(10) Patent No.: US 10,245,684 B2
(45) Date of Patent: Apr. 2, 2019

(54) ROLL-OUT WHEEL FOR PIPE WELDING

(71) Applicant: Roly LLC, Watford City, ND (US)

(72) Inventors: Joel Avellaneda, Watford City, ND (US); Emanuel Gonzalez, Watford City, ND (US)

(73) Assignee: Roly LLC, Watford City, ND (US)

( * ) Notice: Subject to any disclaimer, the term of this patent is extended or adjusted under 35 U.S.C. 154(b) by 415 days.

(21) Appl. No.: 15/062,711

(22) Filed: Mar. 7, 2016

(65) Prior Publication Data

US 2017/0095893 A1    Apr. 6, 2017

Related U.S. Application Data

(63) Continuation-in-part of application No. 29/541,674, filed on Oct. 6, 2015, now Pat. No. Des. 785,685.

(51) Int. Cl.
*B23K 37/04*    (2006.01)
*B23K 37/053*    (2006.01)

(52) U.S. Cl.
CPC ...... *B23K 37/0538* (2013.01); *B23K 37/0452* (2013.01); *B23K 37/0531* (2013.01)

(58) Field of Classification Search
CPC ............ B23K 37/0452; B23K 37/0461; B23K 37/053; B23K 37/0538; B23B 3/00; B23B 3/04; B23B 3/06
See application file for complete search history.

(56) References Cited

U.S. PATENT DOCUMENTS

| 1,453,901 | A | * | 5/1923 | Andersen | B23K 37/0452 269/155 |
| 1,961,605 | A | * | 6/1934 | Drissner | B23Q 3/12 279/158 |
| 2,763,053 | A | * | 9/1956 | Anderson | B23K 37/0452 246/28 F |
| 2,786,434 | A | * | 3/1957 | Klungtvedt | B23K 37/0452 269/60 |
| 2,854,941 | A | * | 10/1958 | Vollmer | B23K 37/0536 269/130 |
| 3,802,277 | A | * | 4/1974 | Pandjiris | B23B 3/04 74/16 |

(Continued)

FOREIGN PATENT DOCUMENTS

| CN | 201516543 U | 6/2010 | |
| CN | 201922204 U | 8/2011 | |
| GB | 1025288 A | * 4/1966 | ......... B23K 37/0538 |

OTHER PUBLICATIONS

CAMCO Welding Positioner. https://web.archive.org/web/20140531075806/http://www.camcoracing.biz/WELDING-POSITIONERS-.html. Published May 31, 2014.*

*Primary Examiner* — Tyrone V Hall, Jr.
(74) *Attorney, Agent, or Firm* — Kelly & Kelley, LLP

(57) ABSTRACT

A roll-out wheel has a base housing secured to a working surface. A rolling arm having a lever end and a working end pivots about a hinge point in the housing. A hand wheel and a pipe chuck are rotatably attached to the working end by a rolling sleeve. A pipe to be welded is securable on the pipe chuck and rotatable in unison with the hand wheel. Rotation of the hand wheel permits welding about the perimeter of the pipe without moving the welding tool. A clamping mechanism can permit or prevent rotation of the hand wheel. A pivoting mechanism can raise or lower the working end.

20 Claims, 16 Drawing Sheets

(56) References Cited

U.S. PATENT DOCUMENTS

2016/0199949 A1* 7/2016 Narducci ........... B23K 37/0538
                                                  269/55
2016/0243658 A1* 8/2016 Greenawalt ........ B23K 37/0452

* cited by examiner

ROLL-OUT WHEEL FOR PIPE WELDING

BACKGROUND OF THE INVENTION

The present invention is directed to a pivoting roll-out wheel for pipe welding and related operations. In particular, a manual roll-out wheel that not only rotates about an axis, but pivots so as to selectively raise and/or lower a pipe being worked upon.

Roll-out wheels are known in the art for facilitating pipe welders in working around the circumference of a pipe or other object having a perimeter. Pipe welders typically perform many tasks on pipes, including welding, joining, grinding, buffing, removing coatings, and other related tasks. The object being worked upon is typically cylindrical and is mounted on a rotating hand wheel such that the object is co-axially disposed with the axis of rotation of the hand wheel. The object may come in shapes other than cylindrical, but cylindrical shapes would roll best in the device.

Such prior art roll-out wheels typically are large, bulky and tied to a fixed location as a manufacturing facility or other physical work space. Very often they require electricity or some other form of energy input to operate motors or other movement functions. Traditional, fixed roll-out devices are preferably adapted for mass production facilities where multiple pieces of identical dimensions are being prepared. The restrictions of such fixed roll-out devices would slow down work progress at job sites where individual or few pieces of particular dimensions must be made. In such cases, measurements would have to be made and transported back to the facility for implementation on the work piece. If the measurements are off or implemented incorrectly, requiring that the work piece has to be remade, such would often not be discovered until the piece is delivered to the job site, which further delays the completion of the project.

Accordingly, there is a need for a roll-out wheel that is more compact, less bulky, and easily transportable so as to allow for mobile roll-out wheel functionality at a job site or other location outside of a manufacturing facility. The present invention fulfills these needs and provides other related advantages.

SUMMARY OF THE INVENTION

While the following description of the inventive roll-out wheel may refer primarily to welding operations, the inventors do not intend to limit this disclosure to welding or joining operations. A person skilled in the art will appreciate how this apparatus will assist related operations such as grinding, buffing, removing coatings, and other similar tasks.

The present invention is directed to a mobile roll-out wheel for use in pipe welding. The mobile roll-out wheel includes a base housing having a mechanism for removably securing the base housing to a surface. The mechanism for removably securing the base housing to a surface comprises a plurality of base feet with bolt holes. The surface preferably comprises a truck bed or similar mobile surface.

A rolling arm is pivotably attached to the base housing at a hinge point so as to be moveable in a vertical plane relative to the base housing. The rolling arm has a working end, a lever end, and the hinge point therebetween. A hand wheel is attached to the working end of the rolling arm and oriented perpendicular to a longitudinal axis of the rolling arm. The hand wheel is rotatable about the longitudinal axis of the rolling arm. A pipe chuck is affixed to a working side of the hand wheel opposite the rolling arm.

The roll-out wheel preferably includes a rolling sleeve concentrically disposed about the working end of the rolling arm. In this case, the hand wheel is attached to the rolling sleeve and the rolling sleeve is rotatable about the longitudinal axis of the rolling arm. A clamp is disposed on the rolling arm and configured to allow free rotation, allow restricted rotation, or prevent rotation of the hand wheel relative to the rolling arm. The clamp preferably includes a friction bar leveraged against the rolling sleeve, wherein the friction bar is leveraged by a threaded arm bolt advanced thereupon.

The roll-out wheel also includes a pivoting mechanism in the base housing, which is configured to pivot the rolling arm about the hinge point. The rolling arm pivots such that the working end moves between a lowered position and a raised position. The pivoting mechanism preferably includes a threaded housing bolt leveraged against and advanced upon the lever end of the rolling arm.

The pipe chuck preferably includes a multi-jawed expansion chuck, wherein each jaw of the expansion chuck is stepped so as to provide at least three exterior facing engagement surfaces.

The roll-out wheel preferably includes a lock on the rolling arm so at to prevent pivoting of the rolling arm about the hinge point. The lock is preferably in the form of a locking port in the base housing and a locking pin configured for insertion into the locking port. When inserted into the locking port, the locking pin contacts the underside of the lever end of the rolling arm, thereby preventing pivoting of the rolling arm about the hinge point. The base housing further includes a storage port for receiving the locking pin when the rolling arm is not locked against pivoting. The storage port is preferably moved toward a rear of the base housing such that the locking pin is beyond the lever end of the rolling arm.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
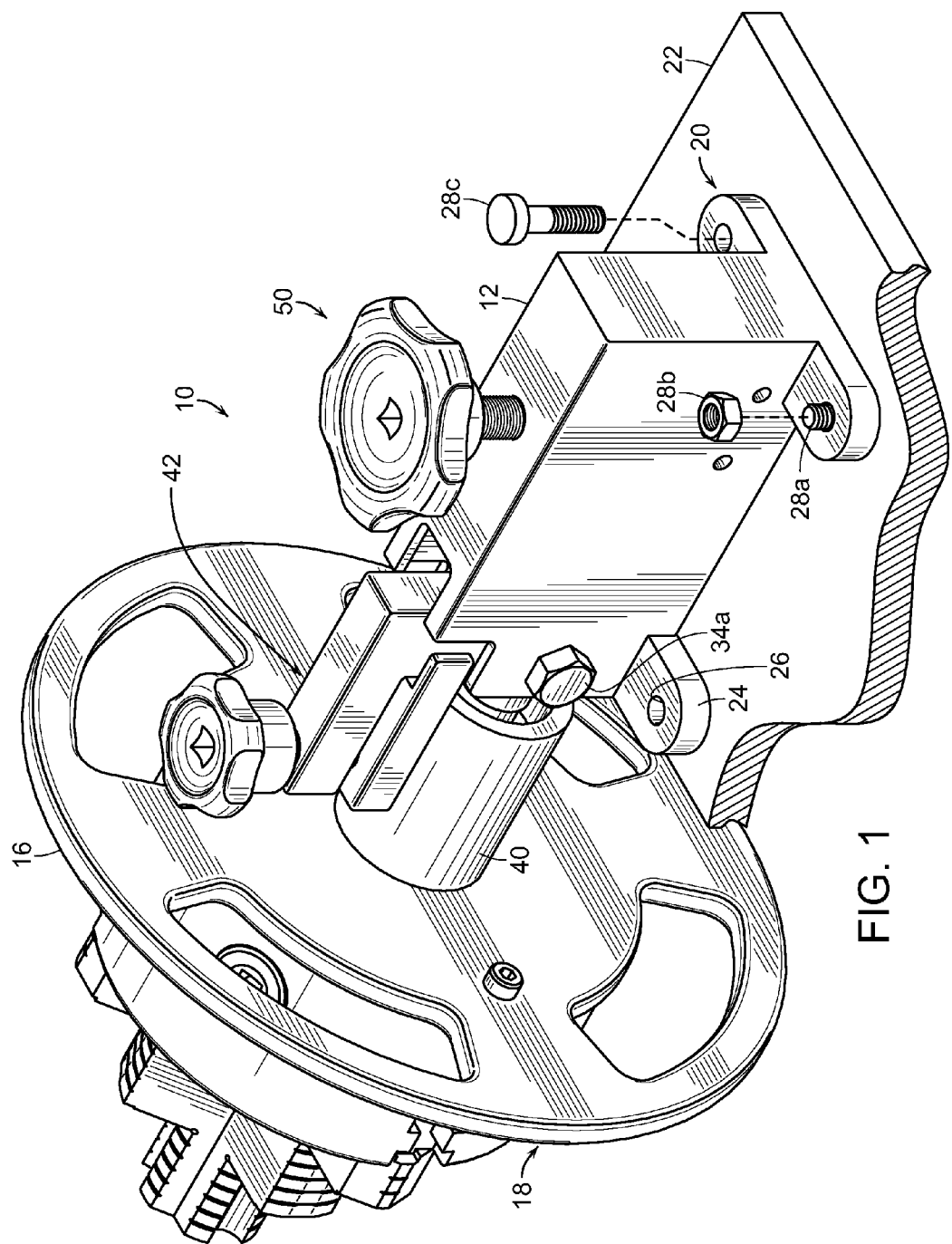
FIG. 1 is a rear, elevated perspective view of the roll-out wheel of the present invention.

In the following detailed description, the roll-out wheel of the present invention is generally referred to by reference numeral 10 in FIGS. 1-7. The individual components and the structural relationship of the components of the roll-out wheel 10 are most clearly shown in FIGS. 1 and 2.

Figure 2:
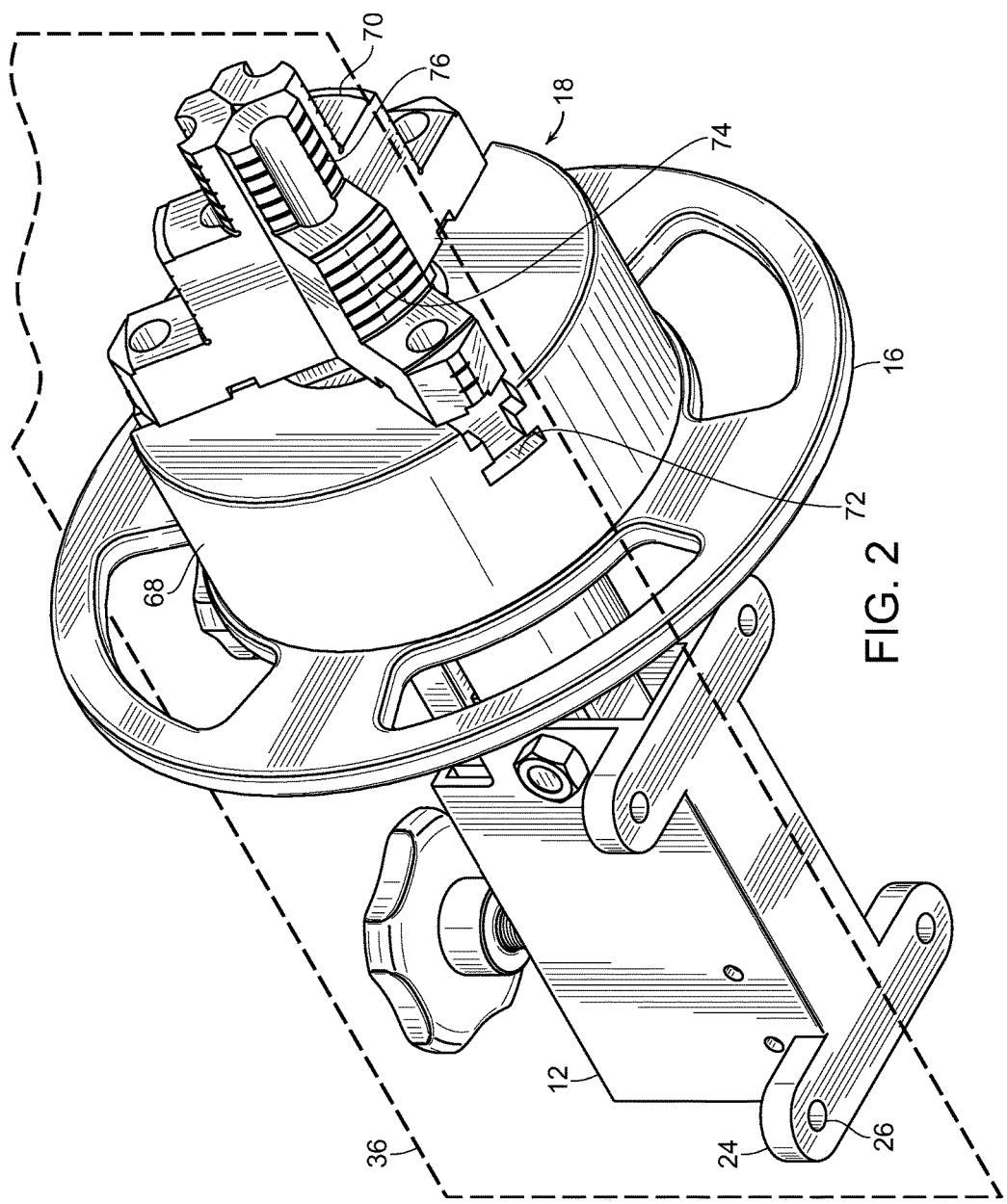
FIG. 2 is a front, lowered perspective view of the roll-out wheel of the present invention.

FIGS. 1 and 2 illustrate rear elevated and front lowered perspective views of the roll-out wheel 10. The roll-out wheel 10 includes a base housing 12, a rolling arm 14, a hand wheel 16, and a pipe chuck 18. The base housing 12 is preferably has a generally rectangular box shape. While the base housing 12 may come in varying shapes, it preferably has a length that is comparatively greater than its width so as to provide increased leverage for pivoting of the rolling arm 14 as discussed below.

The base housing 12 preferably includes a securing mechanism 20 to attach the base housing 12 to a working surface 22. The working surface 22 is preferably a mobile surface as the flat bed of a truck or other surface moveable to a work site. The advantage in this is that the type of welding done using a roll-out wheel can be performed on-site rather than in a workshop or manufacturing facility. Work pieces can be prepared on an as needed basis rather than mass produced. The securing mechanism 20 preferably comprises a plurality of base feet 24 including bolt holes 26 therethrough. The bolt holes 26 may be configured to receive stud bolts 28a attached to the working surface 22 with a mated nut 28b. Alternative, the bolt holes 26 and working surface 22 may be configured to receive a threaded bolt 28c into a mated threaded hole (not shown) in the working surface 22.

Figure 3:
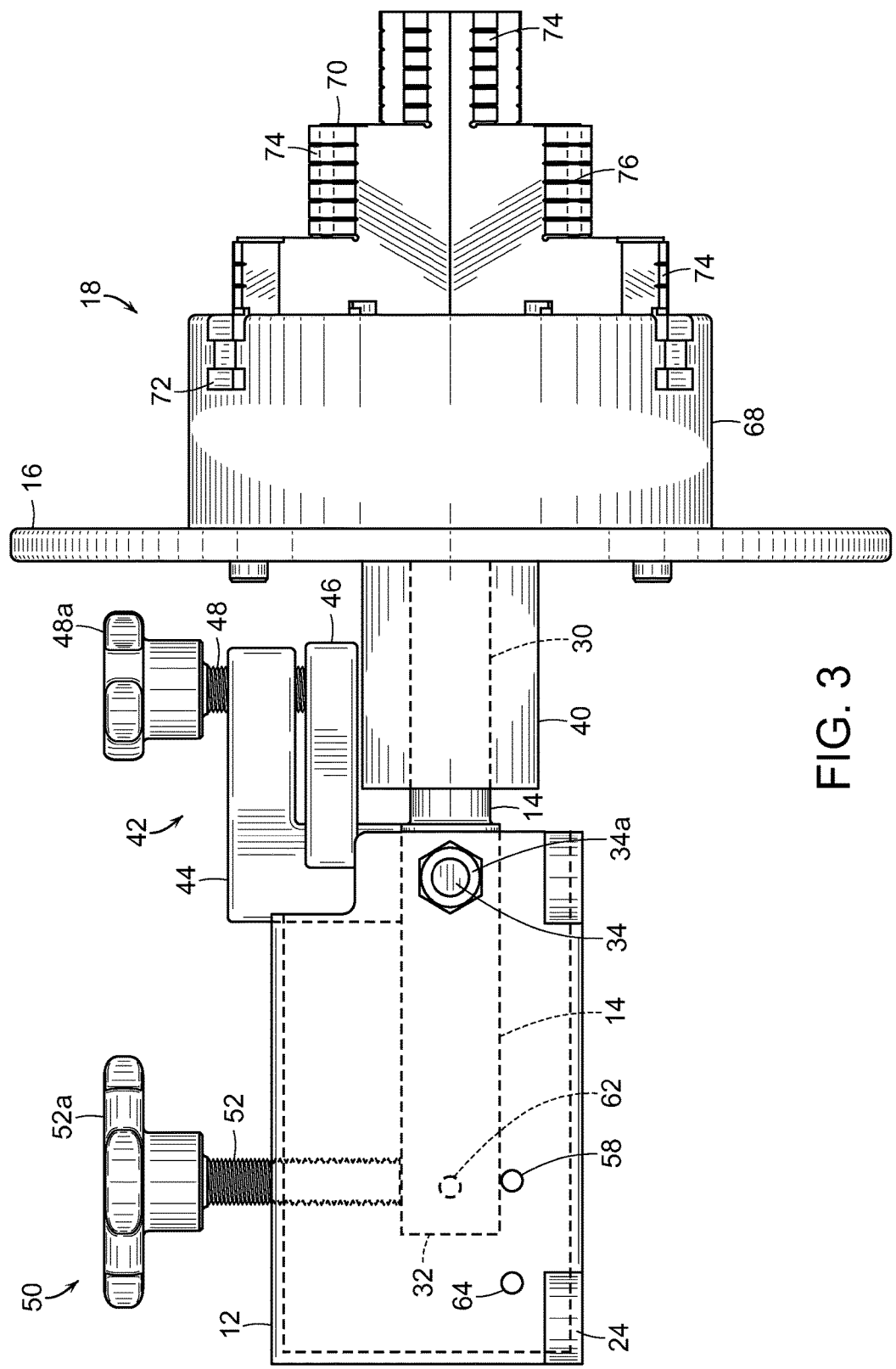
FIG. 3 is a left side view of the roll-out wheel of the present invention.
Figure 4:
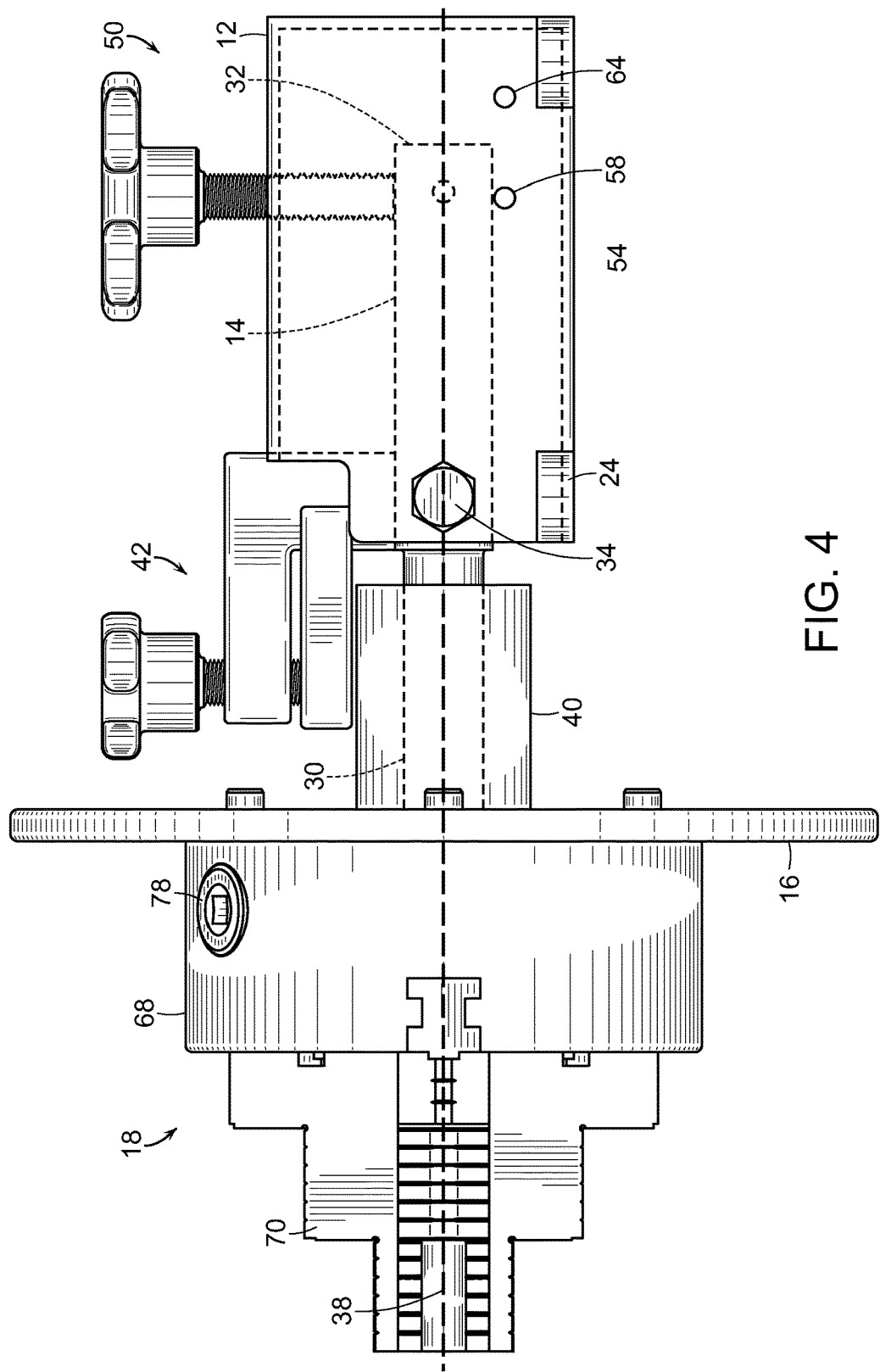
FIG. 4 is a right side view of the roll-out wheel of the present invention.

The rolling arm 14, shown in partial see-through lines in FIGS. 3 and 4, preferably has a working end 30 that extends out of the front of the base housing 12 and a lever end 32 contained within the base housing 12. A hinge point 34 exists between the working end 30 and the lever end 32 with a hinge bolt 34a passing through the base housing 12 and the hinge point 34. The rolling arm 14 preferably pivots about the hinge point 34 in a vertical plane 36 (FIG. 2) of the base housing 12. The rolling arm 14 also has a longitudinal axis 38 that extends from the working end 30 to the lever end 32.

A rolling sleeve 40 is coaxially disposed on the working end 30 of the rolling arm 14. The rolling sleeve 40 is preferably configured with bearings, a sleeve bearing, or similar internal mechanisms to permit substantially free-rotation of the rolling sleeve 40 about the longitudinal axis 38 of the rolling arm 14. The hand wheel 16 is securely attached to the rolling sleeve 40, preferably integrally formed therewith, generally transverse to the longitudinal axis 38 of the rolling arm 14. In this configuration, the hand wheel 16 rotates in conjunction with the rolling sleeve 40 so as to freely rotate about the longitudinal axis 38.

Figure 13:
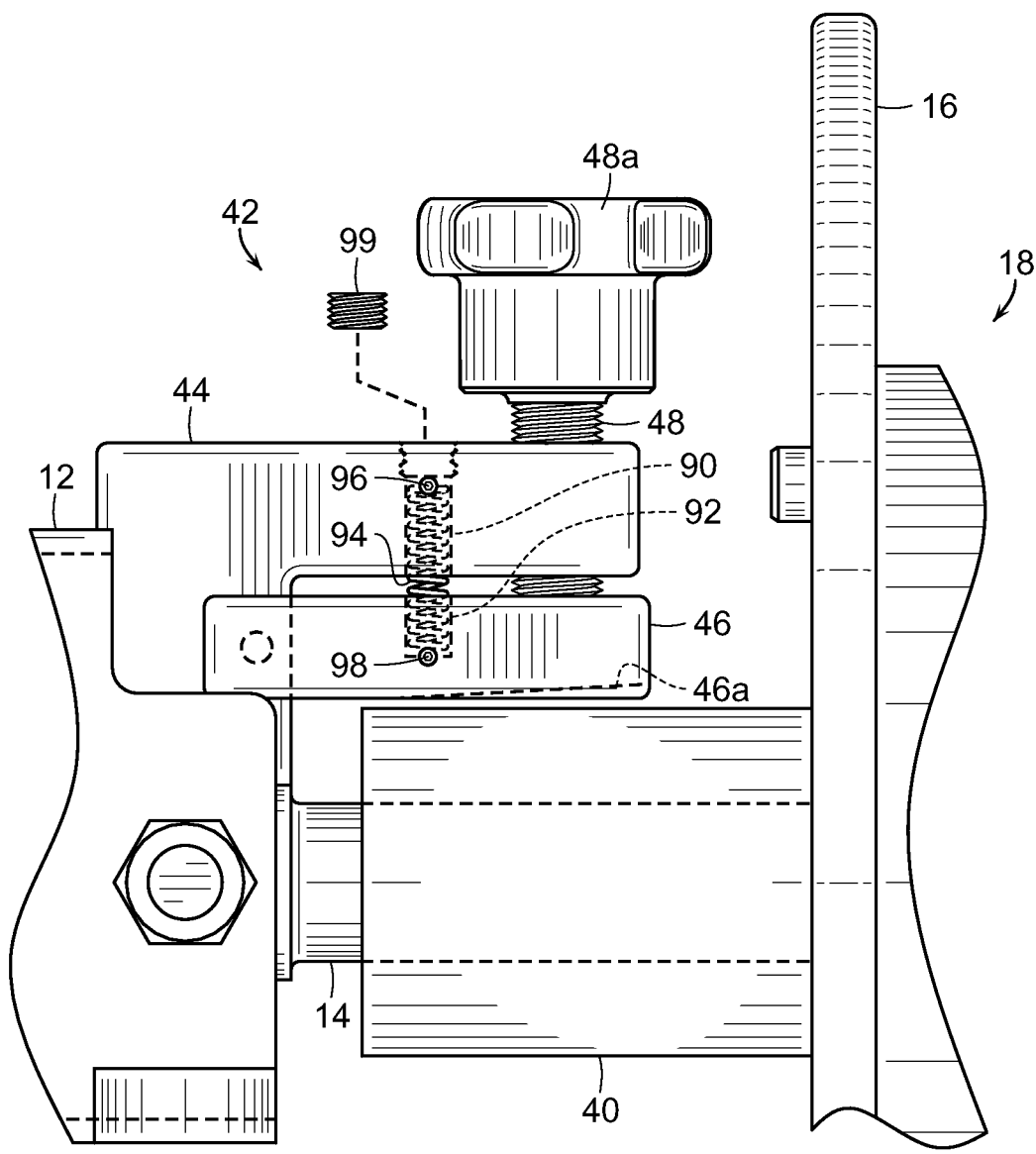
FIG. 13 is a close-up view of the clamping mechanism in a release position.
Figure 14:
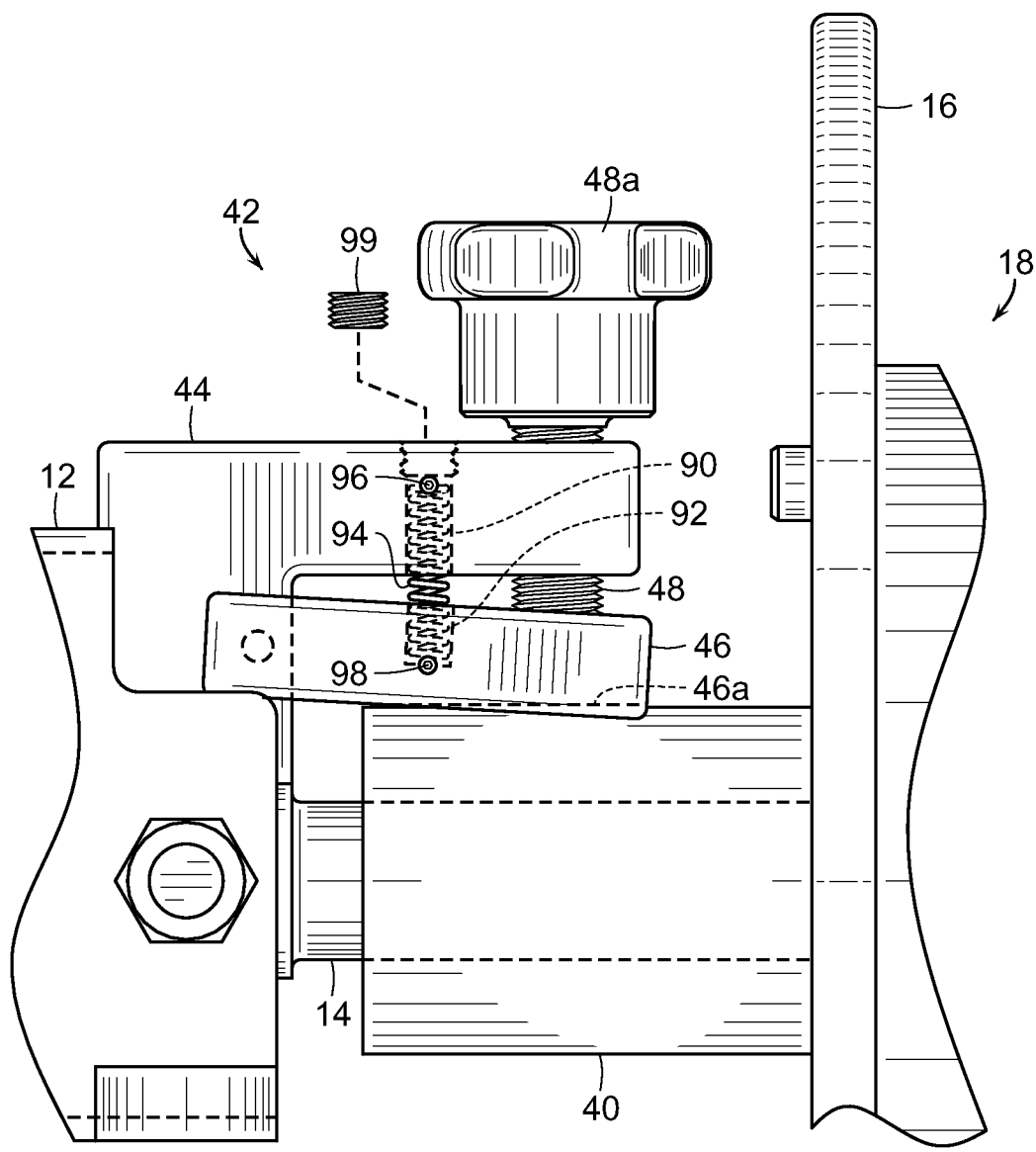
FIG. 14 is a close-up view of the clamping mechanism in a clamping position.

A clamping mechanism 42 is preferably disposed on the working end 30 of the rolling arm 14 adjacent to the rolling sleeve 40. The clamping mechanism 42 includes a support bar 44 and a friction bar 46 disposed between the support bar 44 and the rolling sleeve 40. The friction bar 46 is configured to move between a release position (FIG. 13), wherein it is spaced a distance from the rolling sleeve 40, and a clamping position (FIG. 14), wherein it is abutting against the rolling sleeve 40.

In a particularly preferred embodiment, the clamping mechanism 42 includes spring biasing to lift the friction bar 46 off of the sleeve 40. The spring biasing includes a cylindrical slot 90 that extends through the support bar 44 from the upper surface through the lower surface. A cylindrical cup 92 in the upper surface of the friction bar 46 extends part-way through the same. A biasing spring 94 is inserted through the slot 90 in the support bar 44 and into the cup 92 in the friction bar 46. Retention pins 96, 98 are passed through the sides of the support bar 44 and friction bar 46 respectively so as to securely retain the spring 94 within the slot 90 and cup 92. A plug 99 may be used to cover the opening of the slot 90 in the upper surface of the support bar 44. The spring 94 is configured to a size and resiliency so as to hold the friction bar 46 up—away from the sleeve 40 when no downward force is acting upon the friction bar 46.

A threaded arm bolt 48 may be advanced through the support bar 44 to exert a downward force against the friction bar 46. The downward force of the threaded arm bolt 48 counters the biasing of the spring 94 discussed above. Depending upon how far the threaded arm bolt 48 is advanced, the friction bar 46 may be position at a variety of points between the release position and the clamping position. In the release position, the spring 94 holds the friction bar 46 up against the support bar 44 or the retracted threaded arm bolt 48 so that there is no contact between the friction bar 46 and the sleeve 40. The sleeve 40 is permitted to freely rotate about the rolling arm 14 in the release position.

Figure 14A:
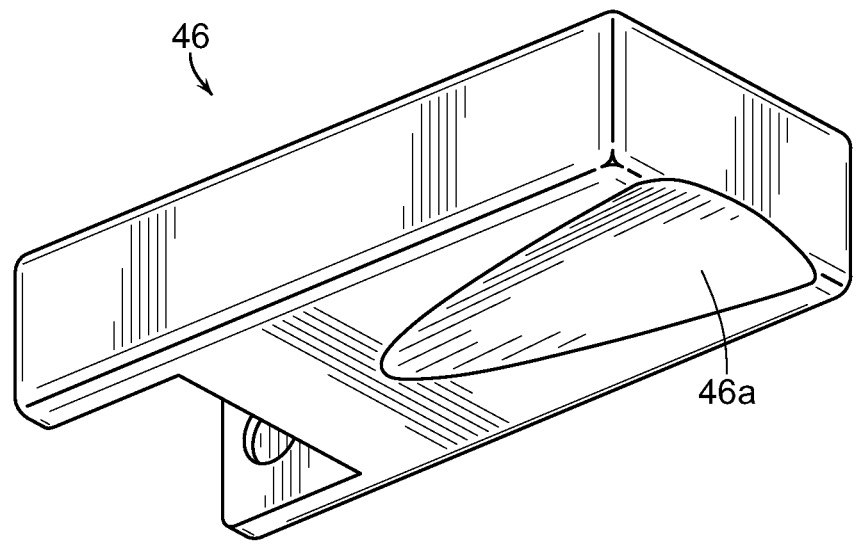
FIG. 14A is an illustration of the friction bar from the clamping mechanism.

In the clamping position, the friction bar 46 may press against the rolling sleeve 40 with varying degrees of force depending upon how far the threaded arm bolt 48 is advanced through the support bar 44. As shown in FIG. 14A, the friction bar 46 may include a parabolic cut-out 46a to match the outer surface of the rolling sleeve 40. The cut-out 46 increases the surface area contact with the rolling sleeve 40 to increase the friction force of the clamping mechanism 42. Because of the available range of advancement of the threaded arm bolt 48, the friction bar 44 may completely prevent rotation of the rolling sleeve 40 or only restrict rotation of the rolling sleeve 40. The threaded arm bolt 48 may be advanced or retracted by the use of a tool such as a wrench or similar means. Preferably, the threaded arm bolt 48 includes a hand-grip head 48a such that advancement may be achieved by hand without a wrench or similar tool.

Figure 9:
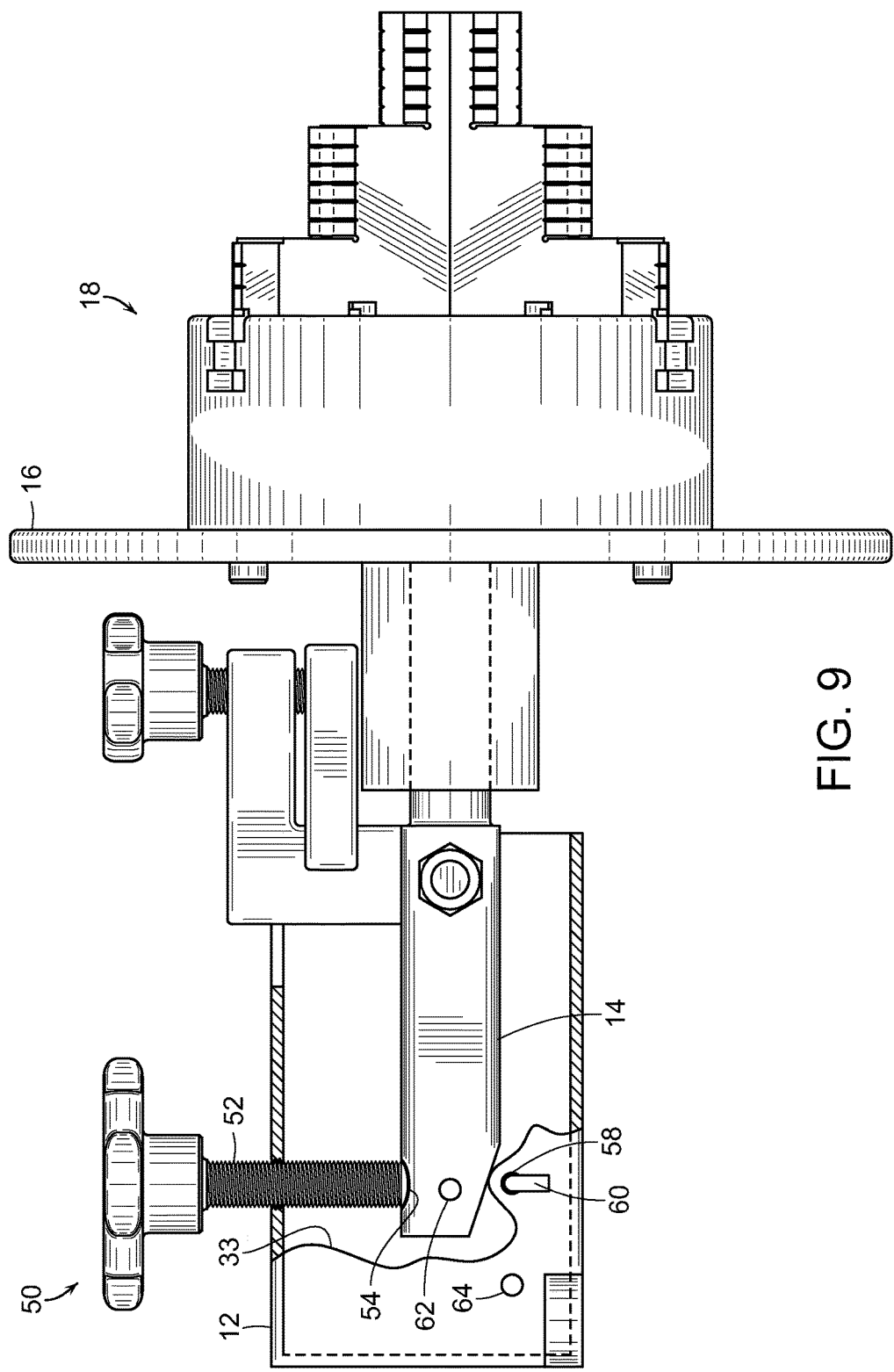
FIG. 9 is an illustration of the roll-out wheel with a cut-away housing showing the rolling arm in a neutral position.

The base housing 12 also includes pivoting mechanism 50 to assist in pivoting the rolling arm 14 about the hinge point 34. The pivoting mechanism 50 preferably consists of a threaded housing bolt 52 that may be advanced through a threaded hole in the top of the base housing 12. The threaded housing bolt 52 extends into the housing such that it may contact the lever end 32 of the rolling arm 14. In a neutral position (FIG. 9), the threaded housing bolt 52 contacts the lever end 32 such that the rolling arm 14 is held in a generally horizontal position relative to the working surface 22.

Figure 10:
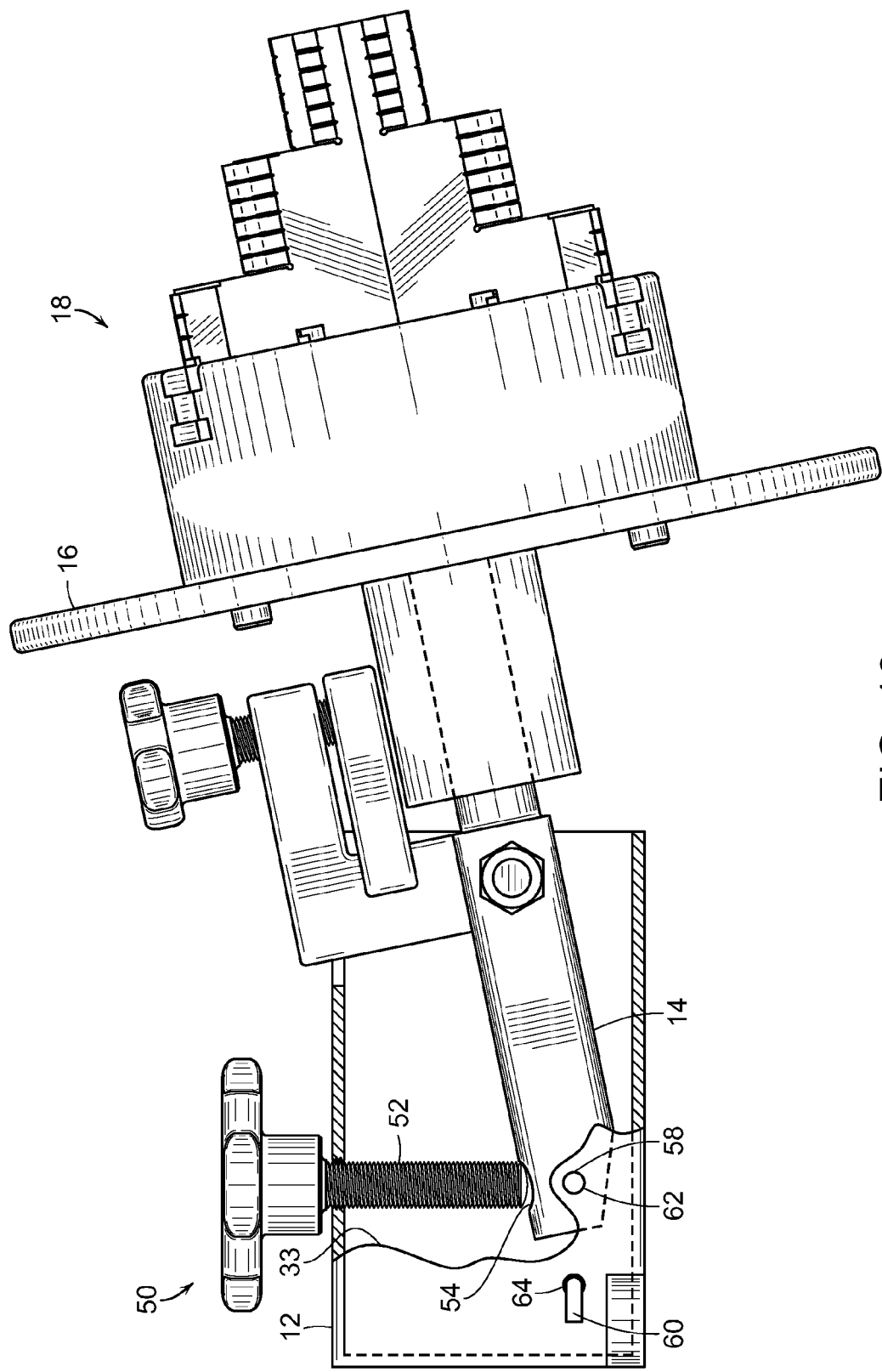
FIG. 10 is an illustration of the roll-out wheel with a cut-away housing showing the rolling arm in a raised position.
Figure 11:
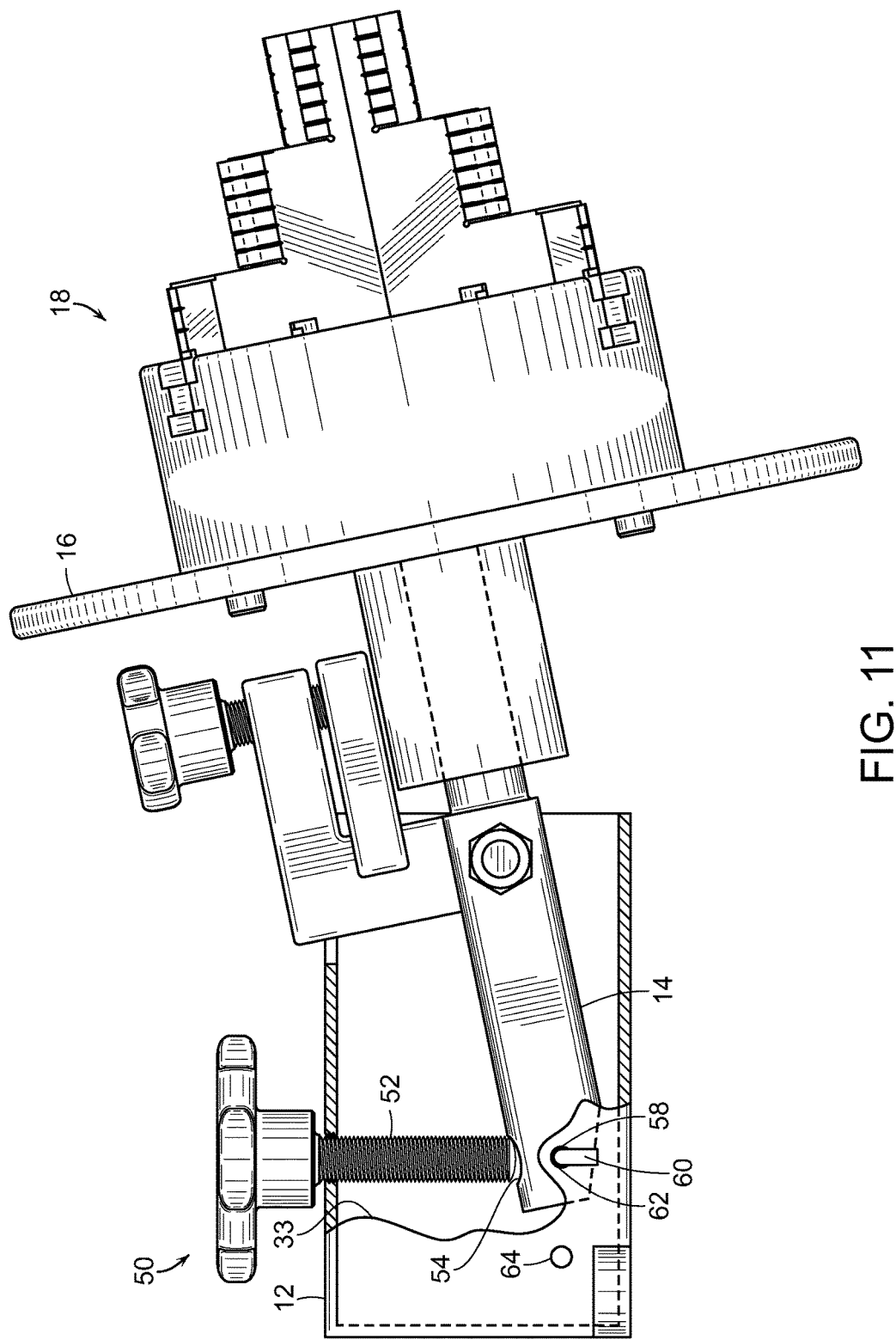
FIG. 11 is an illustration of the roll-out wheel with a cut-away housing showing the rolling arm in a raised position and locked by the locking pin.
Figure 12:
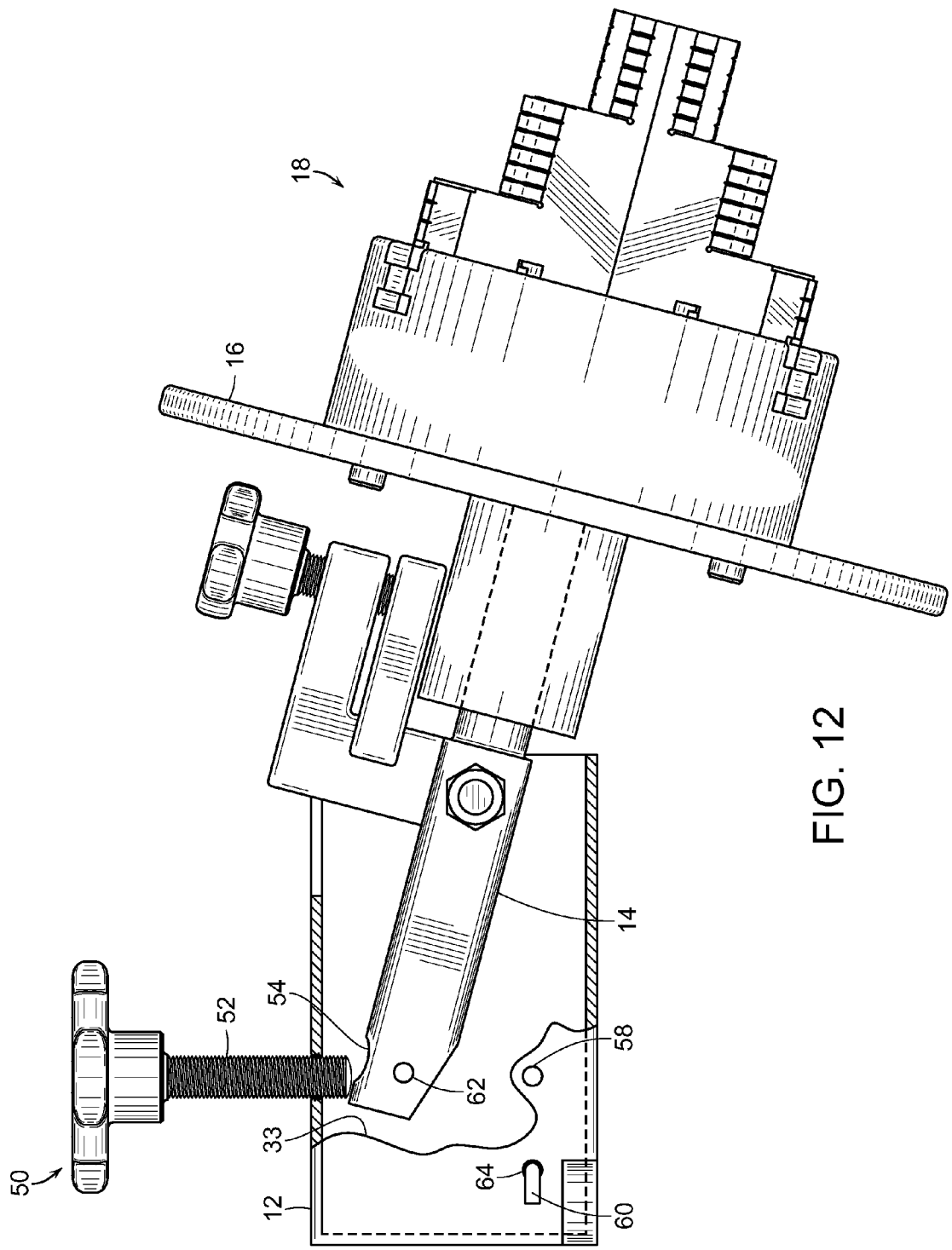
FIG. 12 is an illustration of the roll-out wheel with a cut-away housing showing the rolling arm in a lowered position.

As the threaded housing bolt 52 is advanced into the base housing 12, the lever end 32 is forced downward and the rolling arm 14 pivots about the hinge point 34 such that the working end 30 is placed in a raised position (FIGS. 10 and 11). Conversely, as the threaded housing bolt 52 is retracted from the base housing 12, the lever end 32 is allowed to raised upward and the rolling arm 14 pivots about the hinge point 34 such that the working end 30 is placed in a lowered position (FIG. 12). The further back that the threaded housing bolt 52 contacts the lever end 32, the more leverage that the pivoting mechanism 50 will have in pivoting the rolling arm 14 between the lowered position and the raised position. Preferably, the threaded housing bolt 52 contacts the lever end 32 proximate to the extreme end of the rolling arm 14 without risk of slipping off. The strength of the materials used and the tolerances of construction are such that the bolt 52 will not flex or slip off the lever end 32. As shown in FIGS. 9-12, the lever end 32 may include a recess 54 such that the bolt 52 is less inclined to slip off the lever end 32.

The threaded housing bolt 52 may be advanced or retracted by the use of a tool such as a wrench or similar means. Preferably, the threaded housing bolt 52 has an oversized hand-grip head 52*a* such that advancement may be achieved by hand without a wrench of similar tool. The oversized hand-grip head 52*a* may be necessary to allow for additional leverage when advancing the threaded housing bolt 52 by hand. The forces involved in pivoting the rolling arm 14 into a raised position may become excessive when certain pipe length or sizes are attached to the roll-out wheel 10 as described below.

Figure 8:
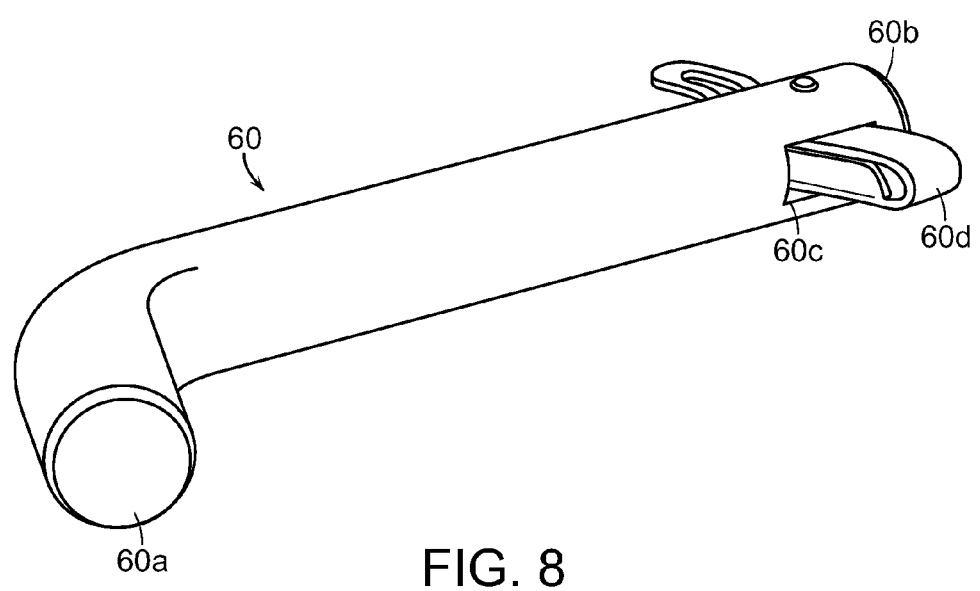
FIG. 8 is a perspective view of the locking pin of the present invention.

The roll-out wheel 10 preferably also includes a locking mechanism 56 proximate to the lever end 32 of the rolling arm 14. The locking mechanism 56 includes locking ports 58 through opposite sides of the base housing 12. The locking mechanism 56 also includes a locking pin 60 (FIG. 8) with a first end 60*a* configured with an angle or bend such that it cannot pass straight through the locking ports 58. The locking pin 60 also has an opposite second end 60*b* that is straight with a slot 60*c* to receive a cotter pin 60*d* or similar structure to secure the pin 60 after it is inserted through the locking ports 58. The locking pin 60 is passed through the locking ports 58 and configured to lock the rolling arm 14 in two different ways. First, the locking pin 60 may pass through the base housing 12 beneath the lever end 32 of the rolling arm 14 (FIG. 9) to hold it in a neutral position and prevent it from being moved to a raised position. Since the locking pin 60 is beneath the lever end 32, the rolling arm 14 can still be placed in a lowered position. Second, the lever end 32 may include a locking hole 62 such that when the rolling arm 14 is in a raised position, the locking pin 60 inserted into the locking ports 58 passes through the locking hole 62 (FIG. 11). In this way, the locking pin 60 through the locking hole 62 may hold the rolling arm 14 in a raised position even if the threaded housing bolt 52 is retracted. This avoids accidental release or lowering of the rolling arm 14 during use.

The locking mechanism 56 may also include storage ports 64 through opposite sides of the base housing 12 for receipt of the locking pin 60 when it is not being used. The storage ports 64 are further to the back of base housing 12 beyond the lever end 32 of the rolling arm 14. In this way, the locking pin 60 is stored and does not interfere with pivoting of the rolling arm 14.

As shown in FIGS. 9-12, the lever end 32 of the rolling arm 14 may include a cut-off or bevel 33 on the underside. This cut-off or bevel 33 permits additional range of motion in the raised position, such that the lever end 32 is less likely to contact the bottom of the housing 12.

Figure 5:
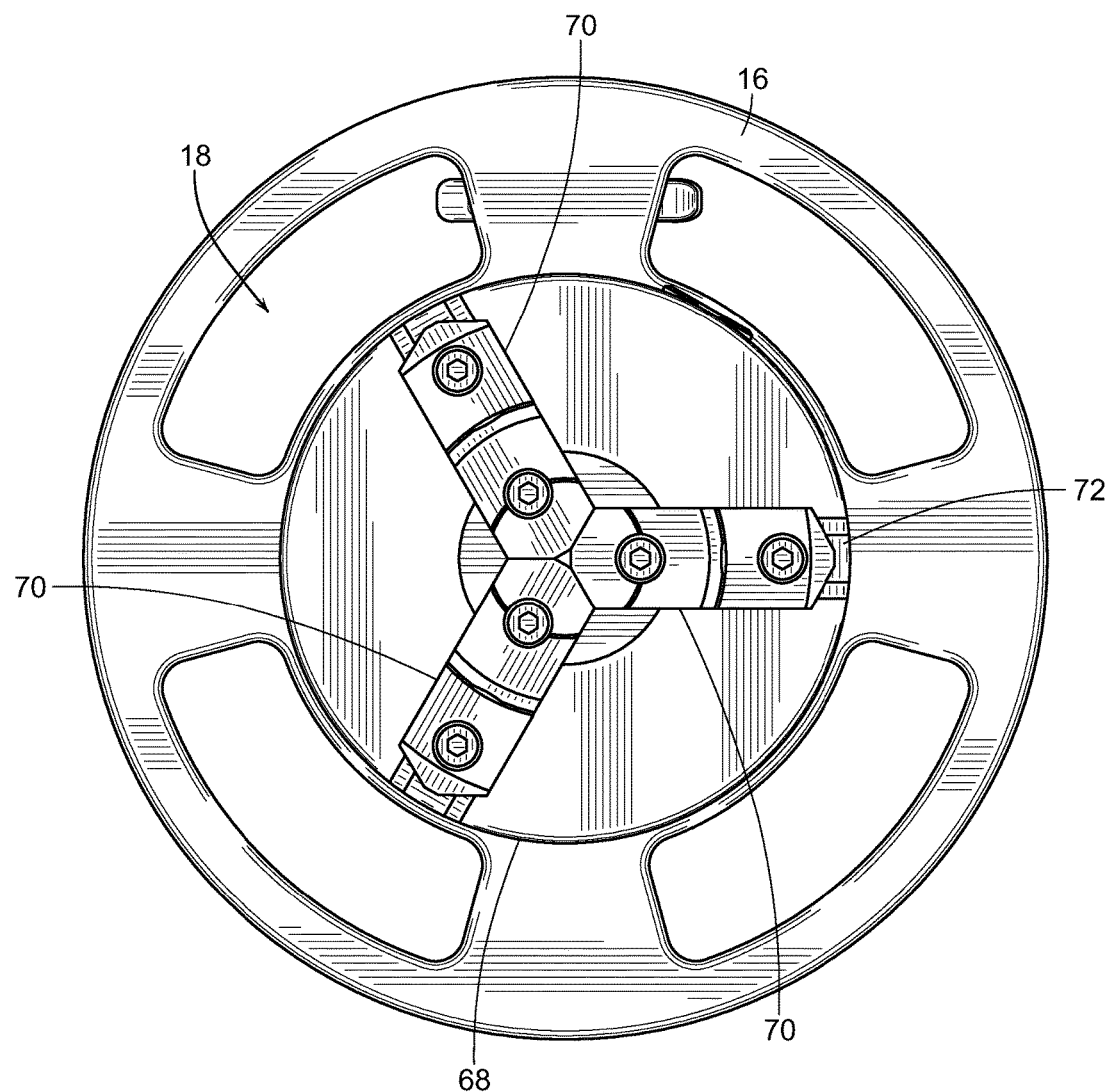
FIG. 5 is a front view of the roll-out wheel of the present invention particularly showing the pipe chuck in a closed position.
Figure 6:
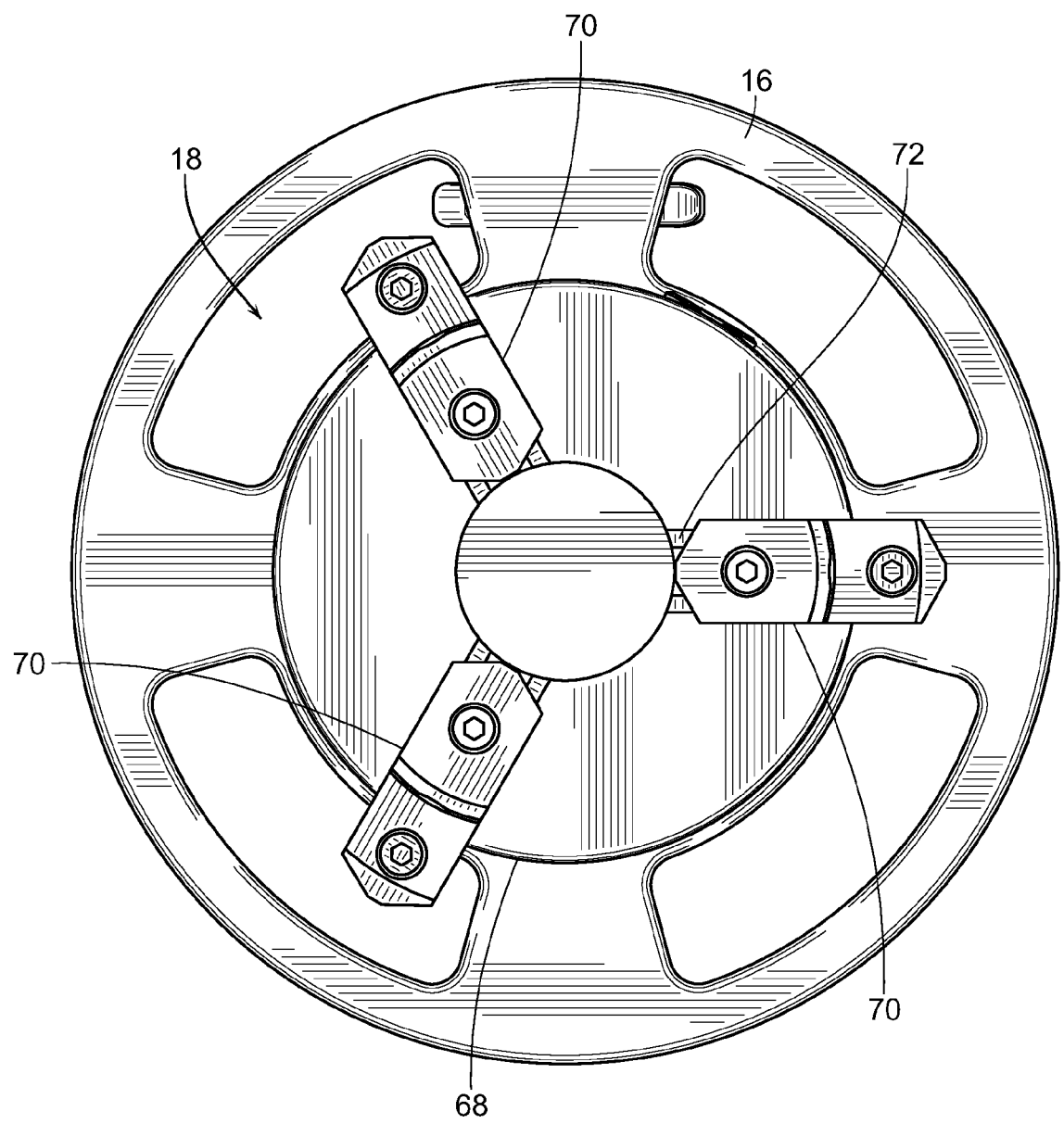
FIG. 6 is a front view of the roll-out wheel of the present invention particularly showing the pipe chuck in a slightly open position.
Figure 7:
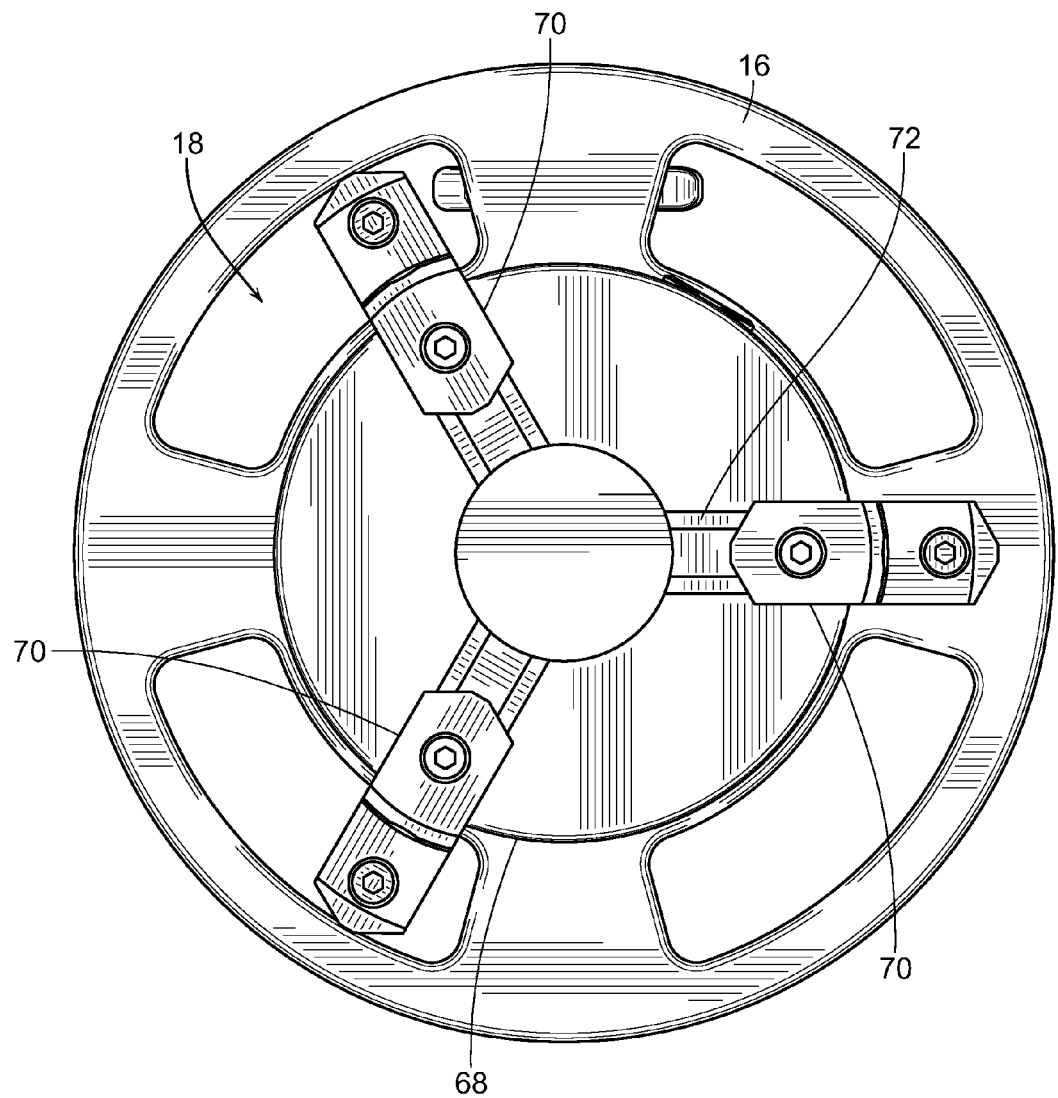
FIG. 7 is a front view of the roll-out wheel of the present invention particularly showing the pipe chuck in a wide open position.

As described above, the hand wheel 16 is attached to the end of the rolling sleeve 40 such that it also rotates about the longitudinal axis 38. A working side 66 of the hand wheel 16 faces away from the rolling sleeve 40 and base housing 12. The pipe chuck 18 mentioned above is removably secured to the working side 66 of the hand wheel 16. As shown in FIGS. 5-7, the pipe chuck 18 preferably is a circular, multi-jawed expansion chuck that functions as commonly understood by those with ordinary skill in the art. The pipe chuck 18 has generally circular base 68 and at least three jaws 70 distributed uniformly about the perimeter of the circular base 68. The jaws 70 are slidably disposed in tracks 72 on the surface of the circular base 68. The interior of the circular base 68 includes gearing (not shown) that extends into the tracks 72 and engage the underside of the jaws 70 so as to mechanically move the same along the tracks 72. A key slot 78 in the side of the circular base 68 is internally connected to the gearing so as to enable one to adjust the position of the jaws 70 relative to the circular base 68 when the key slot 78 is manipulated.

The jaws 70 are preferably stepped or tiered so as to provide multiple contact surfaces 74*a*, 74*b*, 74*c* on each separate jaw 70. Each of the jaws 70 should be identical so that the contact surfaces 74 are each at the same level relative to the circular base 68. When the jaws 70 are assembled with the tracks 72 on the circular base 68, the contact surfaces 74 provide exterior facing engagement surfaces. The contact surfaces 74 may further include a plurality of lines 76 in the engagement surfaces.

In operation, the jaws 70 start in a fully retracted or closed position such that the jaws 70 contact each other in the center of the circular base 68. A pipe to be welded is then slipped over the retracted jaws 70. Depending upon its diameter, the pipe may slide over the first tier 74*a*, the second tier 74*b*, or the third tier 74*c*. The key slot 78 is then manipulated such that the internal gearing forces the jaws 70 outward from the center of the circular base 68. As the jaws 70 expand outward, one of the tiered surfaces 74*a*, 74*b*, 74*c* on each of the three jaws 70 engage the inside of the pipe so as to securely hold the pipe on the pipe chuck 18. The jaws 70 preferably exert enough force on the inside of the pipe so that the same will not slip off or spin about the pipe chuck 18 when in use.

Alternatively, for smaller diameter pipes, the jaws may start in an expanded position and include interior contact surfaces (not shown). In this instance, when the key slot 78 is manipulated, the internal gearing forces the jaws 70 inward toward the center of the circular base 68 so as to secure the smaller diameter pipe within the jaws 70. The jaws 70 then should exert enough force on the outside of the pipe so that the same will not slip out of or spin within the pipe chuck 18 when in use.

With a pipe secured on the pipe chuck 18, the rolling arm 14 may be placed in a raised, lowered or neutral position as described above. The hand wheel 16 may then be rotated about the longitudinal axis 38 such that the pipe chuck 18 and pipe may also be rotated. The rotation of the hand wheel 16 permits a welder to access the entire perimeter of the pipe while holding a welding torch or similar tool in the same position. Rotation of the pipe being welded is much easier for a welder to manipulate than movement of the welding torch about the perimeter of the pipe. The clamping mechanism 42 may be used to restrict or halt the rotation of the pipe as necessary during use.

Figure 15:
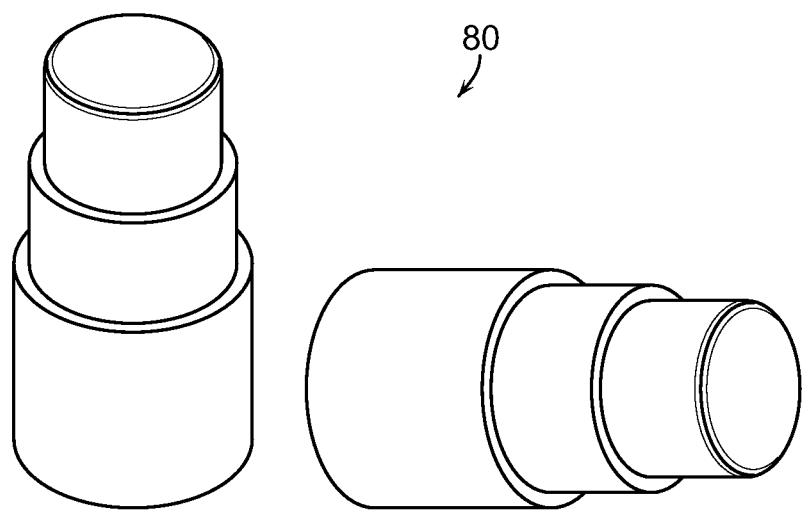
FIG. 15 is an illustration of a pair of two-hole pins.
Figure 16:
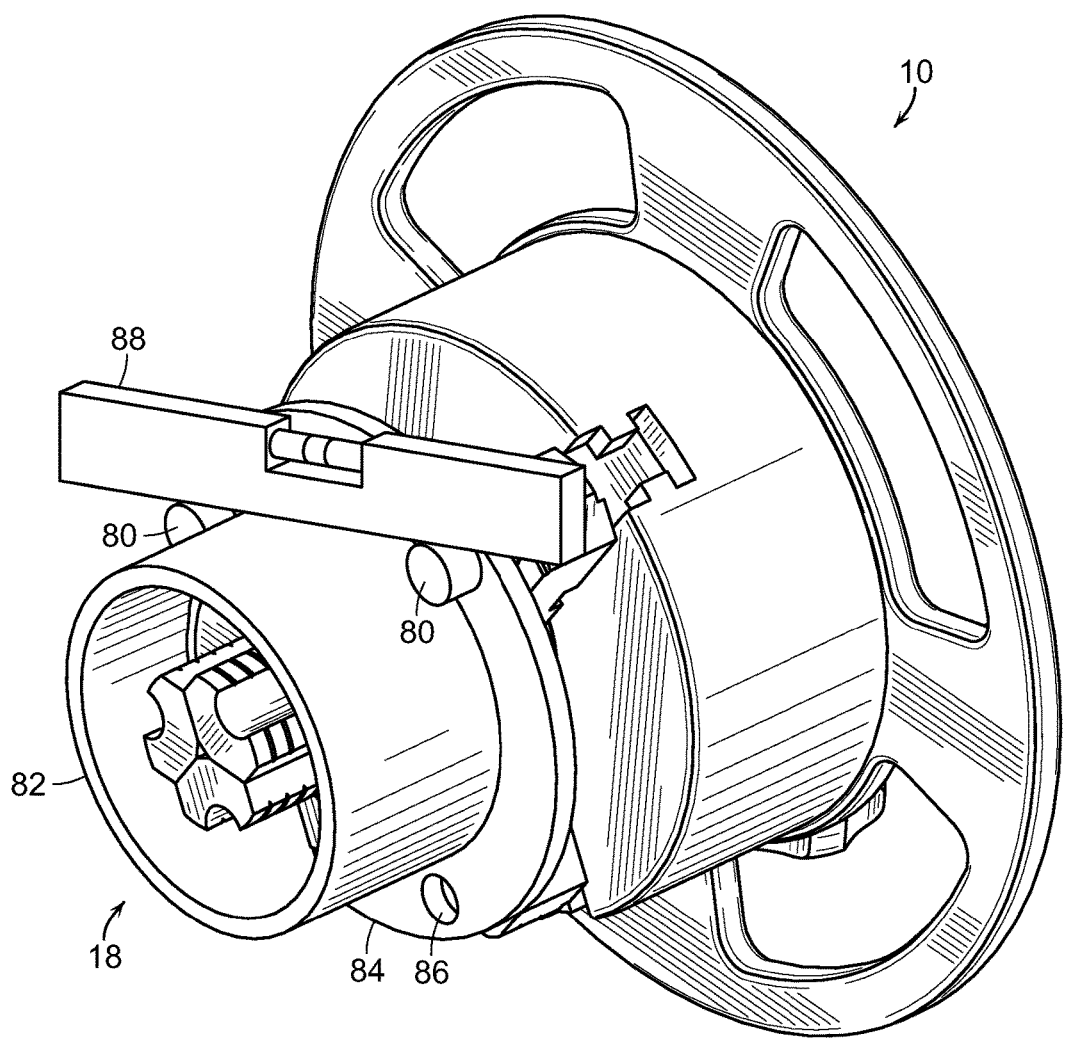
FIG. 16 is an environmental view of the pair of two-hole pins used on a pipe flange.

FIGS. 15 and 16 illustrate the construction and use of a pair of two-hole pins 80 in welding a pipe 82 with a flange 84. As shown in FIG. 16, a pipe 82 with a flange 84 is attached to the pipe chuck 18 on a roll-out wheel 10. The flange 84 includes a plurality of bolt holes 86 around the perimeter. So that a pipe welder may identify and confirm a "top" of a pipe with a flange, the two-hole pins 80 may be inserted into two of the plurality of bolt holes 86. The two-hole pins 80 are preferably magnetic so that they are securely held in the bolt holes 86. The two-hole pins 80 may also be tiered as shown to accommodate bolt holes 86 of varying diameters.

A bubble level 88 or other leveling device may then be rested on the two-hole pins 80 so that a fixed orientation of the pipe 82 with flange 84 relative to the horizontal may be determined. In this way, a pipe welder can identify the proper alignment of a pipe 82 with flange 84 to be welded and attached to another pipe already in place. The clamping mechanism 42 will be particularly helpful in this operation to make sure that the hand wheel 16 will not turn away from the determined horizontal position.

Although several embodiments have been described in detail for purposes of illustration, various modifications may be made without departing from the scope and spirit of the invention. Accordingly, the invention is not to be limited, except as by the appended claims.

What is claimed is:

1. A roll-out wheel for use in pipe welding, comprising:
a base housing having means for removably securing the base housing to a surface;
a rolling arm having a working end, a lever end, and a hinge point therebetween, wherein the rolling arm is pivotably attached to the base housing at the hinge point so as to be moveable in a vertical plane relative to the base housing;
a means for locking the rolling arm so as to prevent pivoting of the rolling arm about the hinge point, wherein the means for locking comprises a locking port in the base housing and a locking pin configured for insertion into the locking port, wherein the locking pin contacts the lever end of the rolling arm when inserted into the locking port, thereby preventing pivoting of the rolling arm about the hinge point;
a hand wheel attached to the working end of the rolling arm and oriented perpendicular to a longitudinal axis of the rolling arm, wherein the hand wheel is rotatable about the longitudinal axis of the rolling arm; and
a pipe chuck affixed to a working side of the hand wheel opposite the rolling arm.

2. The roll-out wheel of claim 1, further comprising a rolling sleeve concentrically disposed about the working end of the rolling arm, wherein the hand wheel is attached to the rolling sleeve and the rolling sleeve is rotatable about the longitudinal axis of the rolling arm.

3. The roll-out wheel of claim 2, further comprising a clamping means on the rolling arm configured to allow free rotation, allow restricted rotation, or prevent rotation of the hand wheel relative to the rolling arm.

4. The roll-out wheel of claim 3, wherein the clamping means comprises a friction bar leveraged against the rolling sleeve, wherein the friction bar is leveraged by a threaded arm bolt advanced thereupon.

5. The roll-out wheel of claim 1, further comprising a pivoting means in the base housing configured to pivot the rolling arm about the hinge point, wherein the rolling arm pivots such that the working end moves between a lowered position and a raised position.

6. The roll-out wheel of claim 5, wherein the pivoting means comprises a threaded housing bolt leveraged against the lever end of the rolling arm advanced thereupon.

7. The roll-out wheel of claim 1, wherein the pipe chuck comprises a multi-jawed expansion chuck, wherein each jaw of the expansion chuck is stepped so as to provide at least three exterior facing engagement surfaces.

8. The roll-out wheel of claim 1, wherein the means for removably securing the base housing to a surface comprises a plurality of base feet with bolt holes.

9. The roll-out wheel of claim 1, further comprising a storage port in the base housing, wherein the locking pin is insertable into the storage port without contacting the rolling arm.

10. A roll-out wheel for use in pipe welding, comprising:
a base housing having a plurality of base feet with bolt holes for removably securing the base housing to a surface;
a rolling arm having a working end, a lever end, and a hinge point therebetween, wherein the rolling arm is pivotably attached to the base housing at the hinge point so as to be moveable in a vertical plane relative to the base housing;
a rolling sleeve concentrically disposed about the working end of the rolling arm, wherein the rolling sleeve is rotatable about the longitudinal axis of the rolling arm;
a hand wheel attached to the rolling sleeve on the working end of the rolling arm and oriented perpendicular to a longitudinal axis of the rolling arm, wherein the hand wheel is fixed to and rotatable with the rolling sleeve;
a clamping mechanism having a support bar and a friction bar disposed adjacent to the rolling sleeve, wherein the friction bar pivots in relation to the support bar and is configured to be leveraged against the rolling sleeve to allow selective rotation of the hand wheel relative to the rolling arm, wherein the friction bar is leveraged by a threaded arm bolt advanced thereupon through the support arm; and
a pipe chuck affixed to a working side of the hand wheel opposite the rolling arm.

11. The roll-out wheel of claim 10, wherein the friction bar is spring biased away from the rolling sleeve when the threaded arm bolt is not advanced thereupon.

12. The roll-out wheel of claim 10, wherein the friction bar has a parabolic cut-out that matches an outer surface of the rolling sleeve.

13. The roll-out wheel of claim 10, further comprising a threaded housing bolt in the base housing leveraged against the lever end of the rolling arm advanced thereupon, wherein the threaded housing bolt is configured to pivot the rolling arm about the hinge point and the rolling arm pivots such that the working end moves between a lowered position and a raised position.

14. The roll-out wheel of claim 10, wherein the pipe chuck comprises a multi-jawed expansion chuck, wherein each jaw of the expansion chuck is stepped so as to provide at least three exterior facing engagement surfaces.

15. The roll-out wheel of claim 10, further comprising a locking port in the base housing and a locking pin configured for insertion into the locking port, wherein the locking pin contacts the lever end of the rolling arm when inserted into the locking port, thereby preventing pivoting of the rolling arm about the hinge point.

16. The roll-out wheel of claim 15, further comprising a storage port in the base housing, wherein the locking pin is insertable into the storage port without contacting the rolling arm.

17. A roll-out wheel for use in pipe welding, comprising:
a base housing having a plurality of base feet with bolt holes for removably securing the base housing to a surface;
a rolling arm having a working end, a lever end, and a hinge point therebetween, wherein the rolling arm is pivotably attached to the base housing at the hinge point so as to be moveable in a vertical plane relative to the base housing;
a locking port in the base housing and a locking pin configured for insertion into the locking port, wherein the locking pin contacts the lever end of the rolling arm when inserted into the locking port, thereby preventing pivoting of the rolling arm about the hinge point
a hand wheel attached to the working end of the rolling arm and oriented perpendicular to a longitudinal axis of the rolling arm, wherein the hand wheel is rotatable about the longitudinal axis of the rolling arm; and
a pipe chuck affixed to a working side of the hand wheel opposite the rolling arm.

18. The roll-out wheel of claim 17, further comprising a storage port in the base housing, wherein the locking pin is insertable into the storage port without contacting the rolling arm.

19. The roll-out wheel of claim 17, further comprising a rolling sleeve concentrically disposed about the working end of the rolling arm, wherein the hand wheel is attached to the rolling sleeve and the rolling sleeve is rotatable about the longitudinal axis of the rolling arm.

20. The roll-out wheel of claim 19, further comprising a friction bar leveraged against the rolling sleeve on the working end of the rolling arm configured to allow selective rotation of the hand wheel relative to the rolling arm, wherein the friction bar is leveraged by a threaded arm bolt advanced thereupon.

\* \* \* \* \*